United States Patent
Eom et al.

(10) Patent No.: US 10,721,289 B2
(45) Date of Patent: Jul. 21, 2020

(54) APPARATUS AND METHOD FOR IMPROVING LOADING TIME IN ELECTRONIC DEVICE

(71) Applicant: Samsung Electronics Co., Ltd., Gyeonggi-do (KR)

(72) Inventors: Yu-Youl Eom, Gyeonggi-do (KR); Sung-Hak Lee, Jeju-do (KR)

(73) Assignee: Samsung Electronics Co., Ltd (KR)

( * ) Notice: Subject to any disclaimer, the term of this patent is extended or adjusted under 35 U.S.C. 154(b) by 307 days.

(21) Appl. No.: 14/640,514

(22) Filed: Mar. 6, 2015

(65) Prior Publication Data
US 2015/0256607 A1 Sep. 10, 2015

(30) Foreign Application Priority Data
Mar. 6, 2014 (KR) .................. 10-2014-0026835

(51) Int. Cl.
*H04L 29/08* (2006.01)

(52) U.S. Cl.
CPC .............. *H04L 67/10* (2013.01); *H04L 67/06* (2013.01); *H04L 67/101* (2013.01); *H04L 67/2842* (2013.01)

(58) Field of Classification Search
CPC ........................ H04L 67/101; H04L 67/2852
See application file for complete search history.

(56) References Cited

U.S. PATENT DOCUMENTS

| | | | | |
|---|---|---|---|---|
| 6,094,662 | A * | 7/2000 | Hawes | G06F 17/30902 |
| 6,216,212 | B1 * | 4/2001 | Challenger | G06F 17/30902 |
| | | | | 707/999.008 |
| 6,587,928 | B1 * | 7/2003 | Periyannan | H04L 29/06 |
| | | | | 709/219 |
| 2002/0198993 | A1 * | 12/2002 | Cudd | G06F 17/30902 |
| | | | | 709/225 |
| 2006/0195660 | A1 * | 8/2006 | Sundarrajan | H04L 69/329 |
| | | | | 711/118 |
| 2007/0101061 | A1 * | 5/2007 | Baskaran | G06F 17/30902 |
| | | | | 711/118 |
| 2010/0161717 | A1 * | 6/2010 | Albrecht | G06F 17/30902 |
| | | | | 709/203 |

(Continued)

FOREIGN PATENT DOCUMENTS

| CN | 102185900 | 9/2011 |
|---|---|---|
| CN | 103532950 | 1/2014 |

(Continued)

OTHER PUBLICATIONS http://www.stevesouders.com/blog/2012/03/22/cache-them-if-you-can/, Cache them if you can, High Performance Web Sites, Mar. 22, 2012, pp. 8.

(Continued)

*Primary Examiner* — William G Trost, IV
*Assistant Examiner* — Christopher P Cadorna
(74) *Attorney, Agent, or Firm* — The Farrell Law Firm, P.C.

(57) ABSTRACT

Disclosed is method for operating of an electronic device, including receiving a resource information list of a web content from a first server, receiving, from the first server, at least one resource included in the resource information list of the web content, and requesting at least one resource of the resource information list of the web content from a second server based on the received resource information list and the received at least one resource.

14 Claims, 11 Drawing Sheets

(56) References Cited

U.S. PATENT DOCUMENTS

| | | | |
|---|---|---|---|
| 2012/0030338 A1 | 2/2012 | Zhang et al. | |
| 2012/0096058 A1 | 4/2012 | Mameri et al. | |
| 2013/0103785 A1* | 4/2013 | Lyon | H04N 21/2385 709/217 |
| 2013/0173693 A1 | 7/2013 | Arsenault | |
| 2013/0226992 A1* | 8/2013 | Bapst | H04L 67/42 709/203 |

FOREIGN PATENT DOCUMENTS

| KR | 1020050035966 | 4/2005 |
|---|---|---|
| KR | 1020100013616 | 2/2010 |

OTHER PUBLICATIONS http://mobile.httparchive.org/interesting.php?a=All&l=Jan%2015%202014&s=Top100, HTTP Archive Mobile—Interesting stats, Jan. 15, 2014, pp. 10.
http://www.webperformancematters.com/display/ShowJournalEntry?moduleld=1113 . . . ,Web Performance Matters—Journal, Latency, Bandwidth, and Response Times, Jul. 24, 2007, pp. 7.
https://www.igvita.com/2012/07/19/latency-the-new-web-performance-bottleneck/, Latency: The New Web Performance Bottleneck—igvita.com, Jul. 19, 2012, pp. 5.
Sevcik, Peter et al., Understanding Web Performance, Oct. 2001, Copyright 2001 NetForecast, Inc. pp. 12.
Westwood, Sam, Global State of LTE Report, Feb. 2013, pp. 5.
Nielsen, Jakob, Response Times: The 3 Important Limits, Jan. 1, 1993, http://www.nngroup.com/articles/response-times-3-important-limits/, pp. 3.
International Search Report dated May 29, 2015 issued in counterpart application No. PCT/KR2015/002175.
European Search Report dated Aug. 9, 2017 issued in counterpart application No. 15759160.3-1853, 8 pages.
Chinese Office Action dated Aug. 3, 2018 issued in counterpart application No. 201580012239.3, 26 pages.
European Search Report dated Nov. 2, 2018 issued in counterpart application No. 15759160.3-1213, 11 pages.
Chinese Office Action dated Jun. 20, 2019 issued in counterpart application No. 201580012239.3, 14 pages.
Korean Office Action dated Apr. 10, 2020 issued in counterpart application No. 10-2014-0026835, 13 pages.
Chinese Office Action dated Mar. 26, 2020 issued in counterpart application No. 201580012239.3, 20 pages.

* cited by examiner

APPARATUS AND METHOD FOR IMPROVING LOADING TIME IN ELECTRONIC DEVICE

PRIORITY

The present application claims priority under 35 U.S.C. § 119 to a Korean Patent Application filed in the Korean Intellectual Property Office on Mar. 6, 2014 and assigned Serial No. 10-2014-0026835, the contents of which are incorporated herein by reference.

BACKGROUND OF THE INVENTION

1. Field of the Invention

The present invention relates generally to an apparatus and method for improving a loading time in an electronic device.

2. Description of the Related Art

Communication methods provided with a separate cloud server between an electronic device and an origin server are known in the art. For example, when the electronic device requests the cloud server to access a webpage, the cloud server requests data of the corresponding webpage from the origin server.

However, when the electronic device requests data of a specific webpage from the cloud server, the cloud server requests the corresponding data from the origin server when the data is an uncacheable resource, which requires many network paths to pass through the cloud server. This causes performance to deteriorate.

In addition, although some uncacheable resources stored in the cloud server can be utilized as cacheable resources, some of these resources may not be utilized, which causes transmission speed to decrease.

SUMMARY OF THE INVENTION

The present invention has been made to address the above mentioned problems and disadvantages, and to provide at least the advantages described below.

Accordingly, an aspect of the present invention is to provide an apparatus and method which determines whether resources included in a main resource are cacheable or uncacheable based on information of resources (any content included in a web page, such as a text, \ image, media, Small Web Format (SWF), JavaScript, or an application) received through a cloud server, determines overall factors such as a time required to receive data through the cloud server, and receives cacheable resources through the cloud server when it is faster to receive the cacheable resources through the cloud server.

Another aspect of the present invention is to provide an apparatus and method in which an electronic device identifies a resource information list received from a cloud server and directly requests only an uncacheable resource from an origin server and receives the same, thereby enhancing user convenience.

Another aspect of the present invention is to provide an apparatus and method in which a cloud server redefines a resource that can be utilized as a cacheable resource from among uncacheable resources as a cacheable resource, thereby reducing a page loading time of an electronic device.

According to an aspect of the present invention, a method for operating of an electronic device includes receiving a resource information list of web content from a first server, receiving, from the first server, at least one resource included in the resource information list of the web content, and requesting at least one resource of the resource information list of the web content from a second server based on the received resource information list and the received at least one resource.

According to another aspect of the present invention, a method for operating of a first server includes receiving a request for at least one resource of web content from at least one electronic device, and pushing, to the electronic device, at least one cacheable resource from among resources of the web content and a resource which is redefined as a cacheable resource in an order according to priority.

According to another aspect of the present invention, an electronic device includes a communication module, and a processor configured to control the communication module, wherein the processor is further configured to receive a resource information list of a web content from a first server through the communication module, receive, from the first server, at least one resource included in the resource information list of the web content, and request at least one resource of the resource information list of the web content from a second server based on the received resource information list and the received at least one resource.

According to another aspect of the present invention, a first server includes a communication module, and a processor configured to control the communication module, wherein the processor is further configured to receive a request for at least one resource of a web content from at least one electronic device, and push, to the electronic device, at least one cacheable resource from among resources of the web content and a resource which is redefined as a cacheable resource in an order according to priority.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
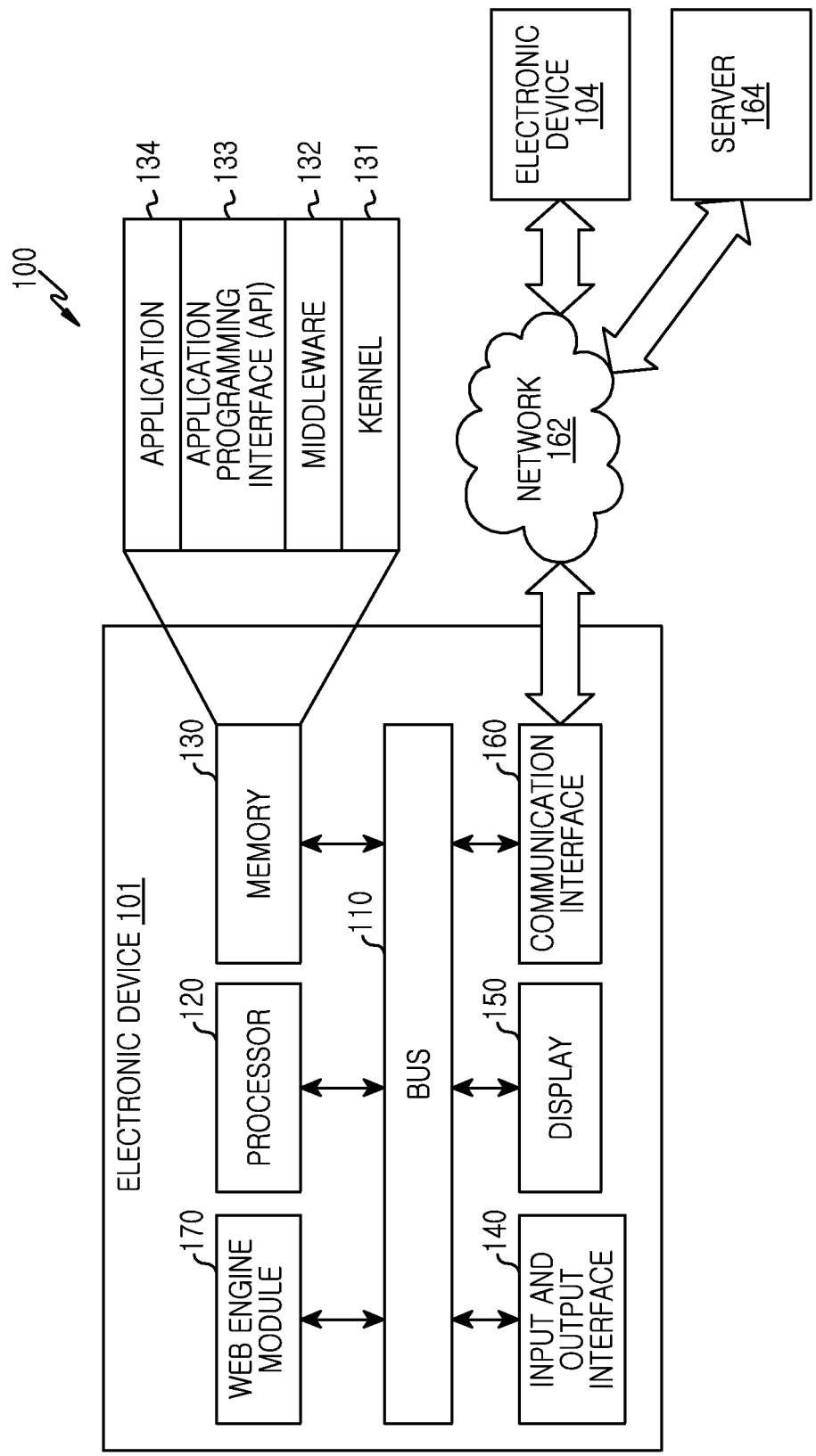
FIG. 1 illustrates a block diagram of a network environment 100 including an electronic device 101 according to embodiments of the present invention.

The present invention will be described with reference to the accompanying drawings. In the drawings, the same or similar elements are denoted by the same reference numerals even though they are depicted in different drawings. In the following description, a detailed description of known functions and configurations incorporated herein will be omitted for the sake of clarity and conciseness.

The terms "include" or "may include" used in embodiments of the present invention indicate the presence of disclosed corresponding functions, operations, elements, and the like, and do not limit additional one or more functions, operations, elements, and the like. In addition, it should be understood that the terms "include" or "have" used in embodiments of the present invention are to indicate the presence of features, numbers, steps, operations, elements, parts, or a combination thereof described in the specifications, and do not preclude the presence or addition of one or more other features, numbers, steps, operations, elements, parts, or a combination thereof.

The term "or" used in embodiments of the present invention includes any and all combinations of words enumerated with it. For example, "A or B" means including A, including B, or including both A and B.

Although the terms such as "first" and "second" used in the embodiments of the present invention may modify various elements of the embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be referred to as a second element without departing from the scope of right of the embodiments of the present invention, and similarly, a second element may be referred to as a first element.

It will be understood that when an element is mentioned as being "connected" or "coupled" to another element, the element may be directly connected or coupled to another element, and there may be an intervening element between the element and another element. To the contrary, it will be understood that when an element is mentioned as being "directly connected" or "directly coupled" to another element, there is no intervening element between the element and another element.

The terms used in the embodiments of the present invention are for the purpose of describing specific embodiments only and are not intended to limit embodiments of the present invention. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the embodiments.

An electronic device according to embodiments of the present invention may be a device that is equipped with a communication function. For example, the electronic device may include at least one of a smartphone, a tablet Personal Computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical machine, a camera, or a wearable device (e.g., a Head-Mounted-Device (HMD) such as electronic glasses, electronic clothing, an electronic bracelet, an electronic necklace, an electronic appcessory, electronic tattoos, or a smartwatch).

The electronic device may be a smart home appliance that is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), a game console, an electronic dictionary, an electronic key, a camcorder, or an electronic album.

The electronic device may include at least one of various medical machines (for example, Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, a navigation equipment for ship, a gyro compass, and the like), avionics, a security device, a head unit for vehicle, an industrial or home robot, an automatic teller machine (ATM) of a financial institution, or point of sales (POS) of a store.

The electronic device also may include at least one of a part of furniture or a building/a structure including a communication function, an electronic board, an electronic signature receiving device, a projector, and various measurement devices (for example, devices for measuring water, power, gas, and radio waves). The electronic device according to embodiments of the present invention may be one or a combination of one or more of the above-mentioned devices. In addition, the electronic device according to embodiments of the present invention may be a flexible device. In addition, it is obvious to an ordinary skilled person in the related art that the electronic device according to embodiments of the present invention is not limited to the above-mentioned devices.

The term "user" used in the embodiments may refer to a person who uses the electronic device or a device that uses the electronic device (for example, an artificial intelligence electronic device).

FIG. 1 illustrates a network environment 100 including an electronic device 101 according to embodiments of the present invention. Referring to FIG. 1, the electronic device 101 may include a bus 110, a processor 120, a memory 130, an input and output interface 140, a display 150, a communication interface 160, and a web engine module 170.

The bus 110 may be a circuit that interconnects the above-described elements and transmits communication (for example, a control message) between the above-described elements.

The processor 120 may receive instructions from the other elements (for example, the memory 130, the input and output interface 140, the display 150, the communication interface 160, or the web engine module 170) via the bus 110, deciphers the instructions, and performs a calculation or data processing according to the deciphered instructions.

The memory 130 may store instructions or data that is received from or generated by the processor 120 or the other elements (for example, the input and output interface 140, the display 150, the communication interface 160, and the web engine module 170). For example, the memory 130 may include programming modules such as a kernel 131, middleware 132, an Application Programming Interface (API) 133, and an application 134, each of which being configured by software, firmware, hardware, or a combination thereof.

The kernel 131 may control or manage system resources (for example, the bus 110, the processor 120, and the memory 130) which are used for performing operations or functions implemented in the other programming modules, i.e. the middleware 132, the API 133, or the application 134. In addition, the kernel 131 may provide an interface for allowing the middleware 132, the API 133, or the application 134 to access an individual element of the electronic device 101 and control or manage the element.

The middleware 132 may serve as an intermediary to allow the API 133 or the application 134 to communicate and exchange data with the kernel 131. In addition, the middleware 132 may perform controlling (for example, scheduling or load balancing) with respect to work requests received from the application 134, for example, by giving priority to use the system resources of the electronic device 101 (for example, the bus 110, the processor 120, and the memory 130) to at least one of the applications 134.

The API 133 may allow the application 134 to control a function provided by the kernel 131 or the middleware 132, and, for example, may include at least one interface or function, such as instructions for controlling a file, window, or text, or processing an image.

According to embodiments, the application 134 may include a Short Message Service (SMS)/Multimedia Messaging Service (MMS) application, an email application, a calendar application, a notification application, a health care application (for example, an application for measuring exercise or a blood sugar), and an environment information application (for example, an application for providing information on atmospheric pressure, humidity, or temperature). Additionally or alternatively, the application 134 may be related to information exchange between the electronic device 101 and an external electronic device (for example, an electronic device 104). For example, the application related to the information exchange may include a notification relay application for relaying specific information to the external electronic device or a device management application for managing the external electronic device.

For example, the notification relay application may include a function of relaying notification information generated by other applications of the electronic device 101 (for example, an SMS/MMS application, email application, health care application, or environment information application) to the external electronic device 104. Additionally or alternatively, the notification relay application may receive notification information from the external electronic device 104 and may provide the same to the user. For example, the device management application may manage (for example, install, delete or update) a function regarding at least part of the external electronic device 104 communicating with the electronic device 101 (for example, turning on/off the external electronic device (or some parts) or adjusting brightness of a display), an application operating in the external electronic device or a service provided by the external electronic device (for example, a calling service or a message service).

According to embodiments, the application 134 may include an application specified according to an attribute (for example, a type of the electronic device 104. For example, when the external electronic device is an MP3 player, the application 134 may include an application related to music replay. Similarly, when the external electronic device is a mobile medical device, the application 134 may include an application related to health care. According to an embodiment, the application 134 may include at least one of an application specified by the electronic device 101 or an application received from the external electronic device (for example, a server 106 or the electronic device 104).

The input and output interface 140 may transmit instructions or data input by a user through an input and output device (for example, a sensor, a keyboard or a touch screen) to the processor 120, the memory 130, the communication interface 160, or the web engine module 170 through the bus 110. For example, the input and output interface 140 may provide data on a user's touch input through a touch screen to the processor 120. In addition, the input and output interface 140 may output instructions or data received from the processor 120, the memory 130, the communication interface 160, or the web engine module 170 through the bus 110 through the input and output device (for example, a speaker or a display). The input and output interface 140 may output voice data processed through the processor 120 to the user through a speaker.

The display 150 may display a variety of information (for example, multimedia data, and text data) for the user.

The communication interface 160 may connect communication between the electronic device 101 and the external device (for example, the electronic device 104 or the server 106). For example, the communication interface 160 may be connected to a network 162 via wireless communication or wire communication to communicate with the external device. The wireless communication may include at least one of Wireless Fidelity (WiFi), Bluetooth (BT), Near Field Communication (NFC), a Global Positioning System (GPS), or cellular communication (for example, Long Term Evolution (LTE), (LTE-A), Code Division Multiple Access (CDMA), WCDMA, Universal Mobile Telecommunications System (UMTS), WiBro, and Global System for Mobile Communications (GSM)). The wire communication may include at least one of a Universal Serial Bus (USB), a High Definition Multimedia Interface (HDMI), a Recommended Standard 232 (RS-232), or Plain Old Telephone Service (POTS).

According to an embodiment, the network 162 may be a telecommunications network that includes at least one of a computer network, the Internet, Internet of things (IoT, or a telephone network. According to an embodiment, a protocol for communicating between the electronic device 101 and the external device (for example, a transport layer protocol, a data link layer protocol or a physical layer protocol) may be supported in at least one of the application 134, the application programming interface 133, the middleware 132, the kernel 131, or the communication interface 160.

The web engine module 170 may control overall operations of the electronic device. According to an embodiment, the web engine module 170 may control overall operations of a resource manager 202, a Resource Information List (RIL) manager 203, a cache DataBase (DB) 204, an RIL DB 205, a trace analyzer 206, a decompression engine 207, and a network manager 208 which are included in the electronic device as will be discussed regarding FIG. 2.

Figure 2:
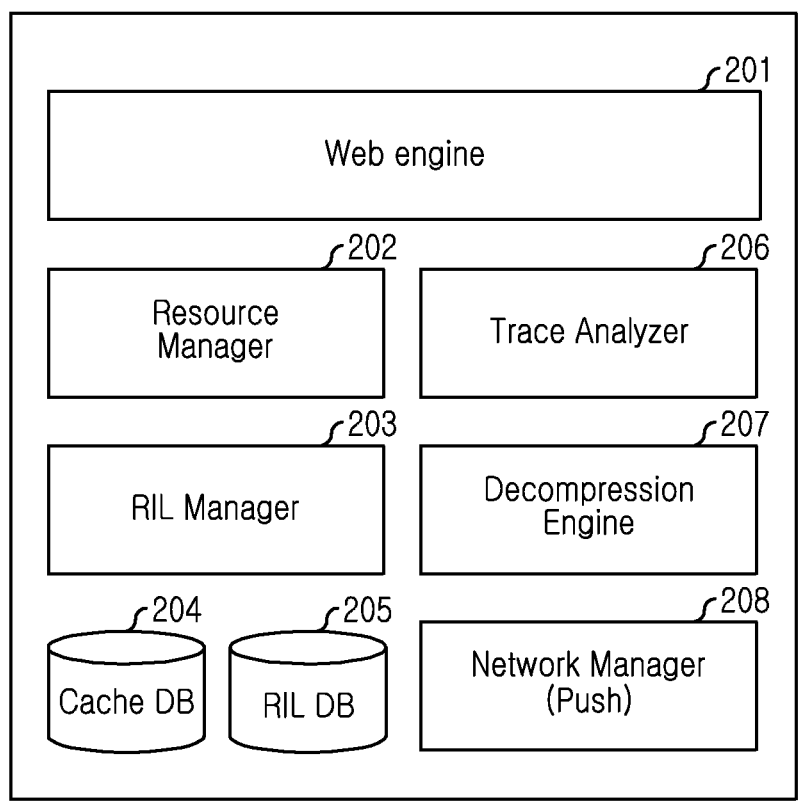
FIG. 2 illustrates a block diagram of an electronic device according to embodiments of the present invention.

FIG. 2 illustrates a block diagram of an electronic device according to embodiments of the present invention. The electronic device may include web engine 201, resource manager 202, RIL manager 203, cache DB 204, RIL DB 205, trace analyzer 206, decompression engine 207, and network manager 208.

The web engine 201 controls overall operations of the electronic device. According to an embodiment, the web engine 201 may control overall operations of the resource manager 202, the RIL manager 203, the cache DB 204, the RIL DB 205, the trace analyzer 206, the decompression engine 207, and the network manager 208 which are included in the electronic device.

The resource manager 202 may manage the resources stored in the electronic device.

The RIL manager 203 may include information on a time at which a cacheable resource is requested/received from a cloud server. Based on this information, a network distance between an origin server and the cloud server is identified and the cacheable resource is received from a server that has a short network distance.

The cache DB 204 may store a cacheable resource. According to an embodiment, the cache DB 204 may store the cacheable resource received from the cloud server.

The RIL DB 205 may store a resource information list. According to an embodiment, the RIL DB 205 may store a resource information list which is updated based on a resource information list received from the cloud server.

The trace analyzer 206 may record, analyze, and manage information on time and order of requesting resources while accessing at least one website in the electronic device. According to an embodiment, the trace analyzer 206 may record, analyze, and manage time and order of requesting a cacheable resource and an uncacheable resource from the cloud server and the origin server, respectively, while web-browsing.

The decompression engine 207 may decompress compressed data which is received from the cloud server.

The network manager 208 may support and manage communication with the cloud server.

Figure 3:
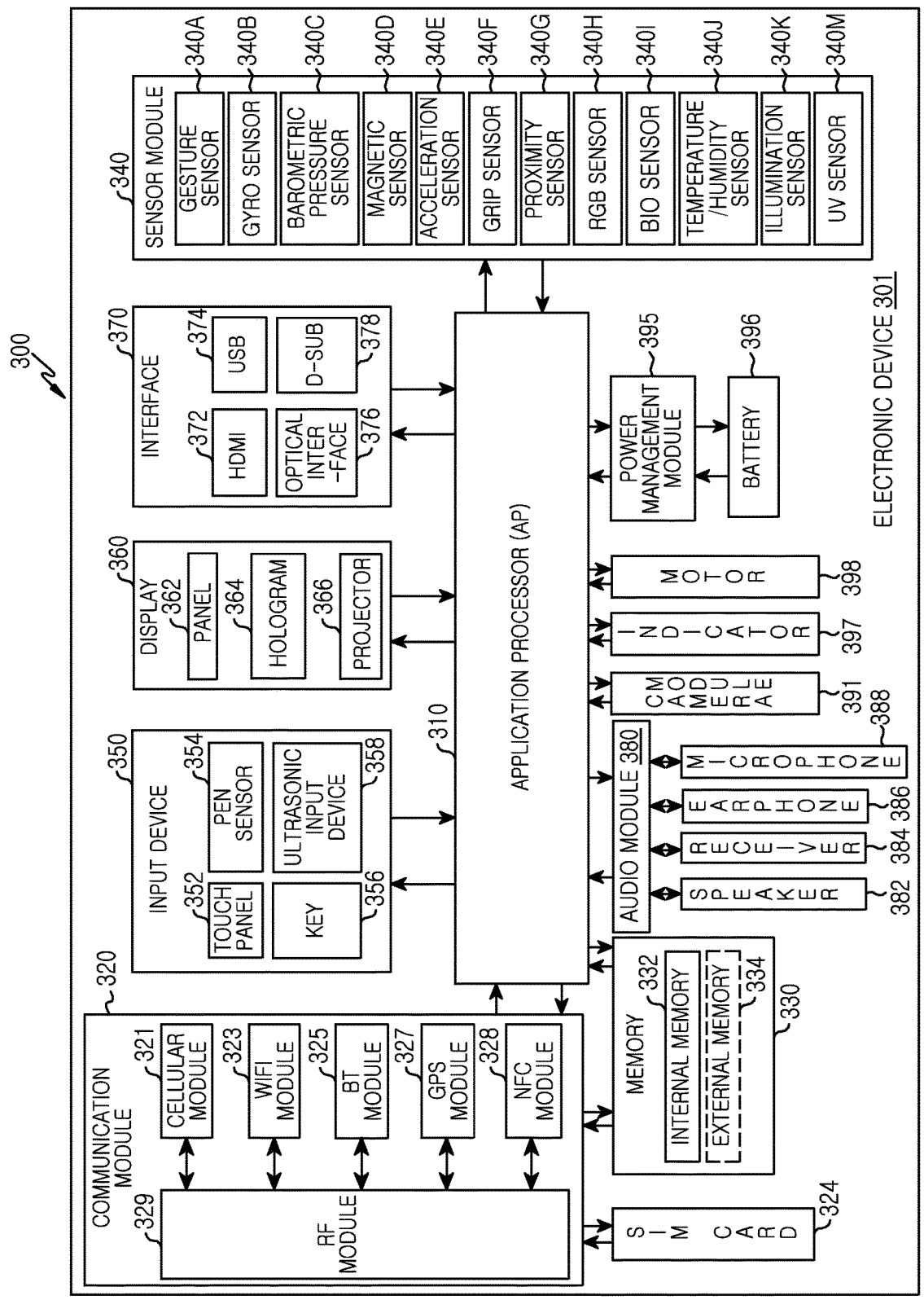
FIG. 3 illustrates a block diagram 300 of an electronic device 301 according to embodiments of the present invention.

FIG. 3 illustrates a block diagram 300 of an electronic device 301 according to embodiments. The electronic device 301 may configure an entirety or part of the electronic device 101 shown in FIG. 1. Referring to FIG. 3, the electronic device 301 may include one or more Application Processors (APs) 310, a communication module 320, a Subscriber Identification Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 may control a plurality of hardware or software elements connected to the AP 310 by driving an operating system or an application program, and may process and calculate a variety of data including multimedia data. For example, the AP 310 may be implemented by using a System on Chip (SoC). According to an embodiment, the AP 310 may further include a Graphics Processing Unit (GPU).

The communication module 320 (for example, the communication interface 160) may transmit and receive data via communication between the electronic device 301 (for example, the electronic device 101) and other electronic devices (for example, the electronic device 104 or the sever 106) connected through a network. According to an embodiment, the communication module 320 may include a cellular module 321, a WiFi module 323, a Bluetooth® (BT) module 325, a GPS module 327, an NFC module 328, and a Radio Frequency (RF) module 329.

The cellular module 321 may provide a voice call, a video call, a text service, or an Internet service through a telecommunications network (for example, LTE, LTE-A, CDMA, WCDMA, UMTS, WiBro, or GSM). In addition, the cellular module 321 may identify and authenticate the electronic device in the telecommunications network by using a Subscriber Identification Module (SIM) card 324. According to an embodiment, the cellular module 321 may perform at least some of the functions provided by the AP 310, and the cellular module 321 may perform at least some of the multimedia control functions.

According to an embodiment, the cellular module 321 may include a Communication Processor (CP), and is implemented by using an SoC, for example. In FIG. 3, the cellular module 321 (for example, the communication processor), the memory 330, or the power management module 395 are elements separate from the AP 310. However, according to an embodiment, the AP 310 may be configured to include at least some of the above-described elements (for example, the cellular module 321).

According to an embodiment, the AP 310 or the cellular module 321 (for example, the communication processor) may load instructions or data received from a non-volatile memory connected therewith or at least one of the other elements into a volatile memory, and may process the instructions or data. In addition, the AP 310 or the cellular module 321 may store data which is received from at least one of the other elements or generated by at least one of the other elements in the non-volatile memory.

Each of the WiFi module 323, the BT module 325, the GPS module 327, and the NFC module 328 may include a processor for processing data received and transmitted through a corresponding module. In FIG. 3, the cellular module 321, the WiFi module 323, the BT module 325, the GPS module 327, and the NFC module 328 is illustrated in a separate block. However, according to an embodiment, at least some (for example, two or more) of the cellular module 321, the WiFi module 323, the BT module 325, the GPS module 327, and the NFC module 328 may be included in a single Integrated Chip (IC) or a single IC package. For example, at least some of the processors corresponding to the cellular module 321, the WiFi module 323, the BT module 325, the GPS module 327, and the NFC module 328 (for example, the communication processor corresponding to the cellular module 321 and the WiFi processor corresponding to the WiFi module 323) may be implemented by using a single SoC.

The RF module 329 may transmit and receive data, such as an RF signal. Although not shown, the RF module 329 may include a transceiver, a Power Amp Module (PAM), a frequency filter, or a Low Noise Amplifier (LNA), for example. The RF module 329 may further include a part for exchanging electromagnetic waves in a free space in wireless communication, such as a conductor or conducting wire. In FIG. 3, the cellular module 321, the WiFi module 323, the BT module 325, the GPS module 327, and the NFC module 328 share the single RF module 329 with one another. However, according to an embodiment, at least one of the cellular module 321, the WiFi module 323, the BT module 325, the GPS module 327, and the NFC module 328 may transmit and receive an RF signal through a single separate RF module.

The SIM card 324 is inserted into a slot formed on a specific location of the electronic device. The SIM card 324 may include its unique identification information (for example, an Integrated Circuit Card Identifier (ICCID)) or subscriber information (for example, International Mobile Subscriber Identity (IMSI)).

The memory 330 (or the memory 130) may include an internal memory 332 and an external memory 334. Although not shown, the internal memory 332 may include at least one of a volatile memory (for example, a Dynamic Random Access Memory (DRAM), a Static Random Access Memory (SRAM), and a Synchronous DRAM (SDRAM)) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, and a NOR flash memory).

According to an embodiment, the internal memory 332 may be a Solid State Drive (SSD). The external memory 334 may further include a flash drive, for example, Compact Flash (CF), Secure Digital (SD), Micro-SD, Mini-SD, extreme-Digital (xD), and memory stick. The external memory 334 may be functionally connected with the electronic device 301 through various interfaces. According to an embodiment, the electronic device 301 may further include a storage device (or a storage medium) such as a hard drive.

The sensor module 340 may measure a physical quantity or detects an operation state of the electronic device 301, and may convert measured or detected information into electric signals. The sensor module 340 may include at least one of a gesture sensor 340A, a gyro sensor 340B, a barometric pressure sensor 340C, a magnetic sensor 340D, an acceleration sensor 340E, a grip sensor 340F, a proximity sensor 340G, a color sensor 340H (e.g., Red, Green, Blue (RGB) sensor), a biosensor 340I, a temperature/humidity sensor 340J, an illumination sensor 340K, and a Ultraviolet (UV) sensor 340M. Additionally or alternatively, the sensor module 340 may include an E-nose sensor, an electromyography (EMG) sensor, an electroencephalogram (EEG) sensor, an electrocardiogram (ECG) sensor, an infrared ray (IR) sensor, an iris sensor, and a fingerprint sensor. The sensor module 340 may include a control circuit to control at least one sensor included therein.

The input device 350 may include a touch panel 352, a (digital) pen sensor 354, a key 356, or an ultrasonic input device 358. The touch panel 352 may recognize a touch input in at least one method of capacitive, resistive, infrared, and ultrasonic methods. The touch panel 352 may further include a control circuit. In the embodiment of a capacitive method, the touch panel 352 may recognize not only physical contact but also approach. The touch panel 352 may further include a tactile layer, whereby the touch panel 352 may provide a tactile response to the user.

The (digital) pen sensor 354 may be implemented in the same or a similar method as the method of receiving a user's touch input or by using a separate detection sheet. The key 356 may include a physical button, an optical key, or a keypad. The ultrasonic input device 358 allows the electronic device 301 to detect sound waves through a microphone 388 through an input device generating ultrasonic signals, and is capable of wireless recognition. According to an embodiment, the electronic device 301 may receive a user input from an external device connected thereto (for example, a computer or a server) by using the communication module 320.

The display 360 (e.g., the display 150) may include a panel 362, a hologram device 364, and a projector 366. The panel 362 may be a Liquid Crystal Display (LCD) or an Active Matrix Organic Light Emitting Diode (AM-OLED), and may be implemented to be flexible, transparent, or wearable. The panel 362 may be configured as a single module along with the touch panel 352. The hologram device 364 may display a stereoscopic image in the air using interference of light. The projector 366 may display an image by projecting light onto a screen. The screen may be located inside or outside the electronic device 301. According to an embodiment, the display 360 may further include a control circuit to control the panel 362, the hologram device 364, and the projector 366.

The interface 370 may include a High Definition Multimedia Interface (HDMI) 372, a Universal Serial Bus (USB) 374, an optical interface 376, and D-subminiature (sub) 378. The interface 370 may be included in the communication interface 160 shown in FIG. 1. Additionally or alternatively, the interface 370 may include a Mobile High Definition Link (MHL) interface, a Secure Digital (SD)/Multimedia Card (MMC) interface or Infrared Data Association (IrDA) standard interface.

The audio module 380 may convert a sound and an electric signal bidirectionally. For example, at least some elements of the audio module 380 may be included in the input and output interface 140 shown in FIG. 1. The audio module 380 may process sound information which is input or output through a speaker 382, a receiver 384, an earphone 386, or a microphone 388.

The camera module 391 is a device for photographing a still image and a moving image, and although not shown, may include one or more image sensors (for example, a front surface sensor or a rear surface sensor), a lens, an Image Signal Processor (ISP), and a flash (for example, a Light Emitting Diode (LED) or a xenon lamp).

The power management module 395 may manage power of the electronic device 301. Although not shown, the power management module 395 may include a Power Management IC (PMIC), a charging IC, or a battery gauge.

For example, the PMIC may be mounted in an integrated circuit or an SoC semiconductor. The charging method includes a wire charging method and a wireless charging method. The charging IC may charge a battery and may prevent inflow of overvoltage or over current from a charger. According to an embodiment, the charging IC may include a charging IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, and a rectifier may be added.

For example, the battery gauge may measure a remaining battery life of the battery 396, voltage, current, or temperature during charging. The battery 396 may store or generate electricity and may supply power to the electronic device 301 by using stored or generated electricity. The battery 396 may include a rechargeable battery or a solar battery.

The indicator 397 may display a specific state or part of the electronic device 301 (for example, the AP 310), for example, a booting state, a message state, or a charging state. The motor 398 may convert an electric signal into a mechanical vibration. Although not shown, the electronic device 301 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

According to embodiments of the present invention, an electronic device may include a communication module, and a processor to control the communication module. The processor may receive a resource information list of a web content from a first server through the communication module, receive, from the first server, at least one resource included in the resource information list of the web content, and request at least one resource of the resource information list of the web content from a second server based on the received resource information list and at least one resource.

According to embodiments of the present invention, the processor may receive the cacheable resource from the first server according to priority of the first sever.

The processor may identify a cacheable resource from among the resources included in the web content based on the received resource information list, calculate an estimated download time of each of the first server and the second server when the identified cacheable resource is downloaded from the first server and the second server, control the communication module to request the cacheable resource from a server that has a shorter estimated download time, and receive the requested cacheable resource.

The processor may receive a cacheable resource being pushed from the first server through the communication module.

The resource information list may include at least one piece of information of information on whether there is a cacheable resource from among the resources of the content, URL information, file type information, file size information, priority information, and timing information.

The processor may receive the uncacheable resource from the second server through the communication module, receive the cacheable resource from one of the first server and the second sever that has a shorter estimated download time for the cacheable resource, and complete loading of the accessed web content based on the received uncacheabler resource and cacheable resource.

The processor may update at least one piece of information until loading of the web content is completed, update the resource information list based on the updated information, and transmit the updated resource information list to the cloud server through the communication module.

Figure 4:
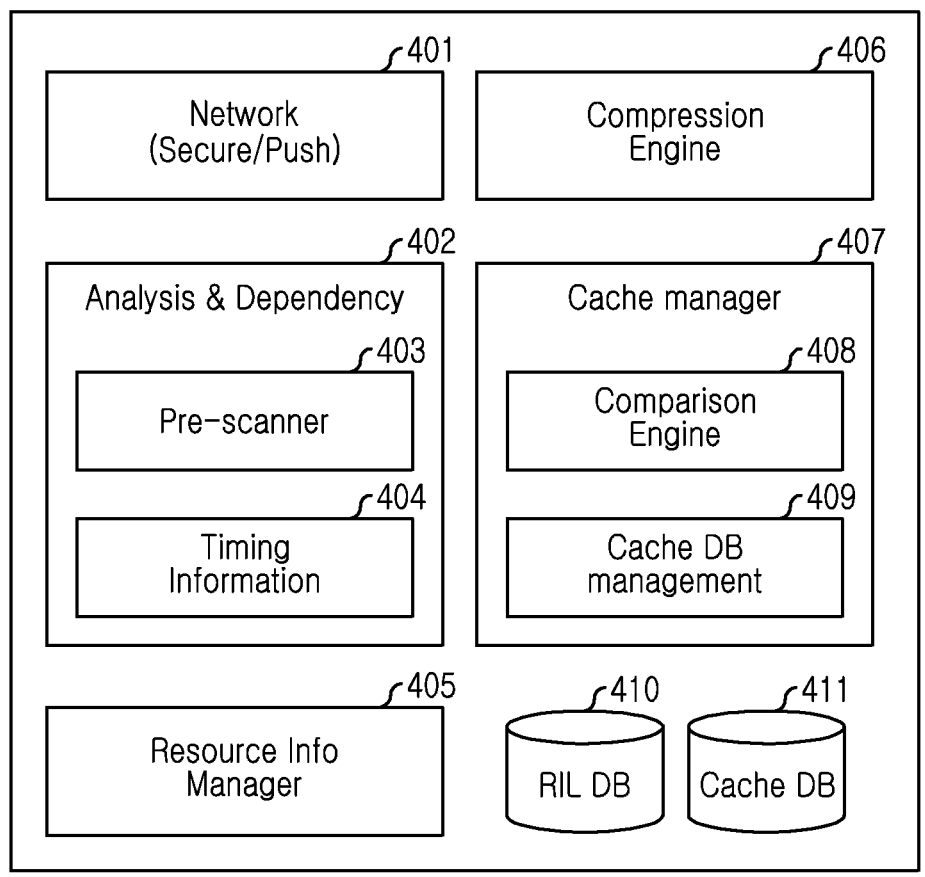
FIG. 4 illustrates a block diagram of a cloud server according to embodiments of the present invention.

FIG. 4 illustrates a block diagram of a cloud server according to embodiments of the present invention. As shown in FIG. 4, the cloud server may include a network 401, an analysis and dependency 402, a resource information manager 405, a compression engine 406, a cache manager 407, an RIL DB 410, and a cache DB 411.

The network 401 may support and manage communication with an electronic device and an origin server.

The analysis and dependency 402 may include a pre-scanner 403 and timing information 404. The pre-scanner 403 included in the analysis and dependency 402 may scan an Hypertext Markup Language (HTML), analyze a resource list in advance, and determine whether a resource is cacheable through the origin server. The timing information 404 included in the analysis and dependency 402 manages timing information received from the electronic device and pushes cacheable resources to the electronic device serially based on the timing information.

The resource information manager 405 may manage resources.

The compression engine 406 may compress resources received from the origin server according to their respective types. According to an embodiment, the compression engine 406 may classify the resources received from the origin server according to their respective types, such as a text, an image, or a video, and may compress the resources.

The cache manager 407 may include a comparison engine 408 and a cache DB management 409. The comparison engine 408 included in the cache manager 407 compares uncacheable resources and stored information, determines whether the uncacheable resources are cacheable resources, and manages the resources. The cache DB management 409 included in the cache manager 407 may store and manage cacheable resources.

The RIL DB 410 stores a resource information list, and the cache DB 411 stores cacheable resources.

According to embodiments of the present invention, a first server may include a communication module and a processor to control the communication module. The processor may receive a request for at least one resource of a web content from at least one electronic device through the communication module, and push, to the electronic device, at least one cacheable resource from among resources of the web content and a resource which is redefined as a cacheable resource serially according to priority.

The processor may push a resource information list of the web content to the electronic device through the communication module.

The resource information list may include at least one piece of information related to whether there is a cacheable resource from among the resource of the web content, URL information, file type information, file size information, priority information, and timing information.

The redefined resource may include an uncacheable resource which is identified as having no resource information changed from among uncacheable resources included in the web content.

The processor may receive an updated resource information list from the electronic device through the communication module, update the received resource information list, and store the updated resource information list.

Figure 5:
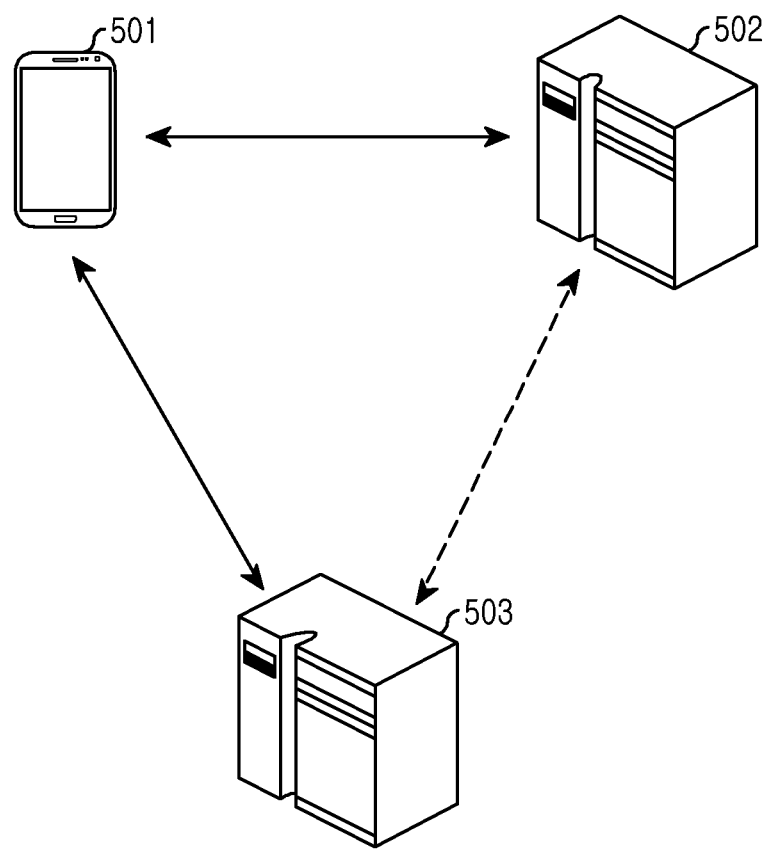
FIG. 5 illustrates an overall view according to embodiments of the present invention.

FIG. 5 illustrates an overall view according to embodiments of the present invention. As shown in FIG. 5, the overall configuration may include an electronic device 501, a cloud server 502, and an origin server 503.

The electronic device 501 may access the cloud server 502 and requests resources of a website. According to an embodiment, when the electronic device 501 receives an input of an address (Uniform Resource Locator (URL)) of the website, the electronic device 501 may access the cloud server 502 and may request resources configuring the input website from the cloud server 502.

According to embodiments, the cloud server 502 may determine whether a main resource of the website requested by the electronic device 501 is a cacheable resource. When it is determined that the main resource of the website requested by the electronic device 501 is an uncacheable resource, the cloud server 502 may request the main resource from the origin server 503. When it is determined that the main resource of the website requested by the electronic device 501 is a cacheable resource, the cloud server 502 may use the main resource stored in the cloud server 502.

According to embodiments, a general cacheable resource follows a cache policy prescribed on an HTTP protocol, but a cacheable resource recited in the present invention includes a general cacheable resource according to the HTTP standard and a resource which is not specified as a cacheable resource, but may be processed as a temporary cacheable resource since the resource is unchanged for a specific time.

The cloud server 502 may transmit a resource information list of the website stored in the cloud server 502 to the electronic device 501. When the cloud server 502 receives a request for resource information of "A website" from the electronic device 501, the cloud server 502 may transmit the resource information list of "A website" stored in the cloud server 502 to the electronic device 501. The resource information list may include at least one piece of information of information on whether there is a cacheable resource from among the resources of the website, and information such as URL, file type, file size, priority, and timing information.

According to embodiments, the cloud server 502 may redefine a resource that was unchanged for a specific period as a result of comparing with the previous one from among the uncacheable resources as a cacheable resource. The cloud server 502 pushes a cacheable resource and a resource redefined as a cacheable resource serially according to priority. When a bandwidth of a network connected with the electronic device 501 is sufficient, the cloud server 502 may transmit all of the cacheable resources to the electronic device 501 until the electronic device 501 receives the main resource.

When the cloud server 502 requests the main resource from the origin server 503, the cloud server 502 may receive the main resource from the origin server 503. According to an embodiment, when the main resource is a cacheable resource as described above, the operation of receiving the main resource from the origin server 503 by the cloud server 502 may be omitted.

When requesting a resource, the electronic device 501 may determine whether the resource is an uncacheable resource based on the resource information list. According to embodiments, the electronic device 501 may request an uncacheable resource from the origin server 503. The electronic device 501 may analyze the resource information list received from the cloud server 502 and may request only the uncacheable resource from among the resources of the accessed website from the origin server 503.

The electronic device 501 may receive the requested uncacheable resource from the origin server 503. Specifically, the electronic device 501 may receive the cacheable resource from among the resources of the accessed website from the cloud server 502, and may receive the uncacheable resource from the origin server 503.

The electronic device 501 may complete loading of the accessed website based on the cacheable resource received from the cloud server 502 and the uncacheable resource received from the origin server 503. For example, when the electronic device 501 accesses "A website", the electronic device 501 completes loading of "A website" by receiving the cacheable resource from among the resources of "A website" from the cloud server 502 and receiving the uncacheable resource from the origin server 503. In another example, when the electronic device 501 accesses "A website", the electronic device 501 compares an estimated download time (for example, a Round Trip Time (RTT) measuring time) for the cacheable resource from among the resources of "A website" through the cloud server 502, and an estimated download time for the cacheable resource through the origin server 503. When the estimated download time through the cloud server 502 is longer than that through the origin server 503, the electronic device 502 completes the loading of "A website" by receiving the cacheable resource from the origin server 503 and receiving the uncacheable resource from the origin server 503.

The electronic device 501 may transmit an updated resource information list to the cloud server 502. According to an embodiment, the electronic device 501 may update at least one piece of information until the loading of the accessed website is completed, and then may update the resource information list based on the updated information and transmit the updated resource information list to the cloud server 502.

According to embodiments, the cloud server 502 may update the resource information list based on the resource list received from the electronic device 501 and store the updated resource information list. When the cloud server 502 receives a request for the resource of the same website from the electronic device 501, the cloud server 502 may transmit the resource information list which has been updated and stored to the electronic device 501.

Figure 6B:
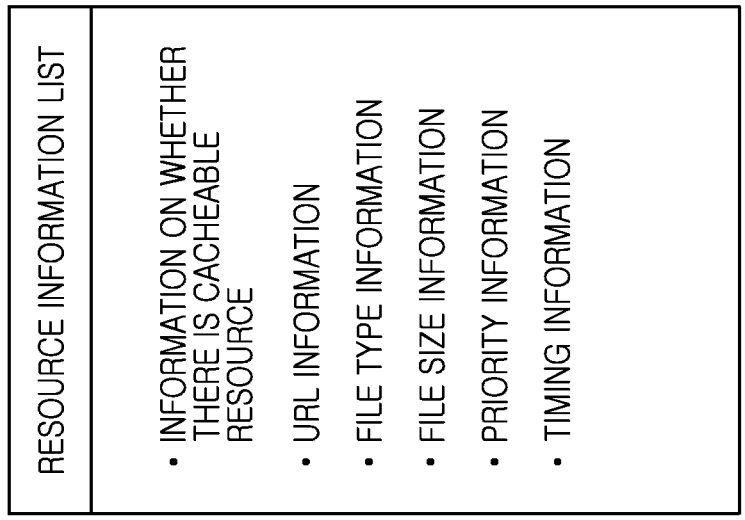
FIGS. 6A and 6B illustrate types of resources and a resource information list according to embodiments of the present invention.
Figure 6A:
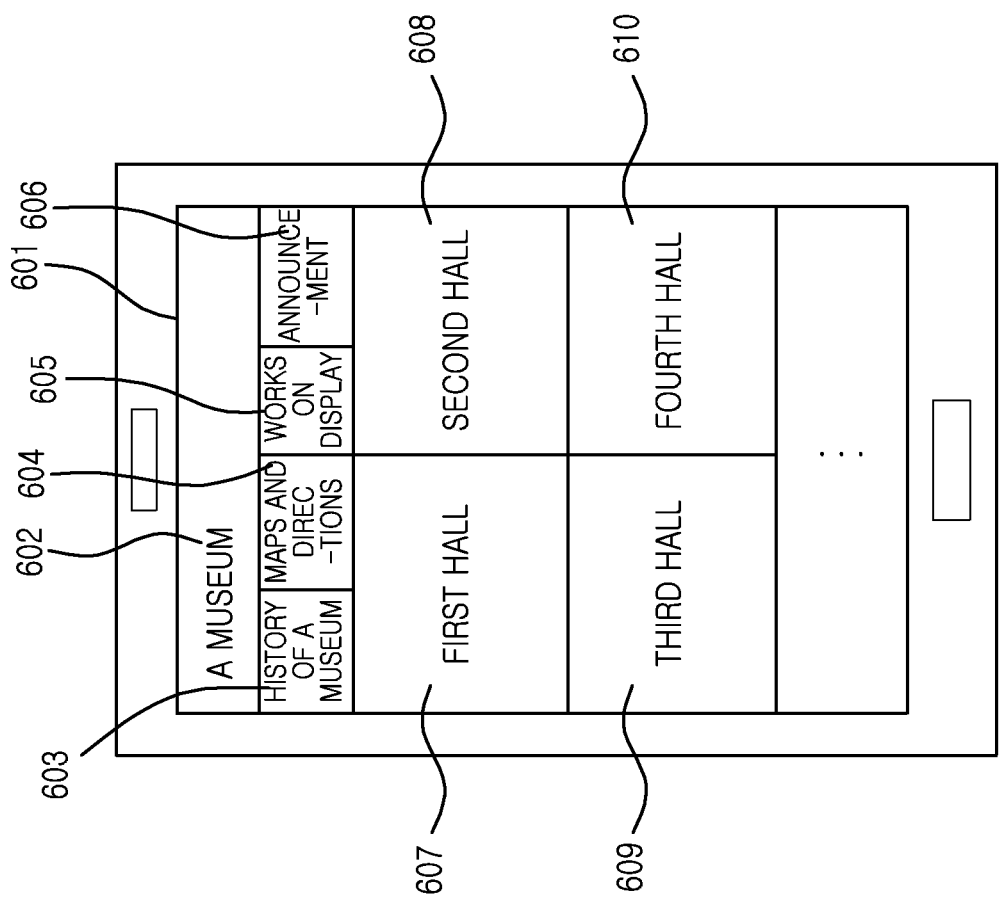

FIGS. 6A and 6B illustrate views of types of resources and a resource information list according to embodiments of the present invention. FIGS. 6A and 6B illustrate when an electronic device accesses a website of "A art museum" and receives a resource information list from a cloud server, by way of an example.

When the electronic device receives an input of a URL of "A art museum", the electronic device may access the cloud server and receive a resource information list which has been already created and stored from the cloud server. The electronic device may receive the resource information list including information on whether there is a cacheable resource, and information including URL, file type, file size, priority, and timing information from the cloud server.

For example, the resource information list may include information on whether there is a cacheable resource from among the resources included in the website of "A art museum", URL information of "A art museum", file type information included in the website of "A art museum" (a text, an image, and a video file), file size information included in the website of "A art museum", priority information of a resource which is to be received first from among cacheable resources to be received from the cloud server, and timing information on a time at which the electronic device transmits and receives resources to and from the cloud server and the origin server.

The above-described cacheable resource may refer to a resource that has not been changed within a time from among the resources of the website, and the above-described uncacheable resource may refer to a resource that is expected to be changed within a predetermined time from among the resources of the website.

When the electronic device receives the input of the URL of "A art museum", the electronic device may access the cloud server and receive the cacheable resources from among the resources of "A art museum" serially according to priority. Specifically, a specific resource may be required when a webpage is rendered in a general browsing operation. In this case, the resources of the webpage may be blocked until the specific resource is requested and received. However, since the cloud server pushes the resources in advance and in order by considering the timing information, the time during which a corresponding resource is blocked when being received can be minimized.

The following describes when the resource is an image. According to an embodiment, the electronic device may receive, from the cloud server, cacheable resources which have not been changed within a predetermined time, such as "name of A art museum 602", "history of A art museum 603", and "maps and directions 604", serially according to priority. For example, when the priority is given in order of "name of A art museum 602", "history of A art museum 603", and "maps and directions 604" in the cloud server, the electronic device may receive the cacheable resources serially in order of "name of A art museum 602", "history of A art museum 603", and "maps and directions 604" from the cloud server.

According to an embodiment, when a main resource 601 of "A art museum" is a cacheable resource, the electronic device may receive the main resource 601 and the cacheable resources simultaneously from the cloud server.

As described above, the electronic device may receive the cacheable resources serially according to the priority set in the cloud server, and may receive all of the cacheable resource simultaneously.

According to embodiments, the electronic device may receive a resource which is redefined as a cacheable resource from among the uncacheable resources from the cloud server along with the cacheable resources. When uncacheable resources including information on "works on display 605" and "first to fourth halls 607-610" from among the uncacheable resources have no cache-related content on an HTTP header, 1-day may be reset as a cache period. When these resources are marked with "uncacheable", but have not been changed as a result of comparing/checking with the past record in a 1/3/7/14-day period, the resources may be processed as temporary cacheable resources and transmitted to the electronic device. When the cloud server receives a main resource, scans an HTML, and determines that the resources processed as the temporary cacheable resources are changed, the cloud server may transmit a new resource to the electronic device such that the resource is re-modified when the webpage is rendered.

According to embodiments, the electronic device may identify an uncacheable resource from among the resources of "A art museum" included in the resource information list received from the cloud server, and may request the identified uncacheable resource from the origin server. The electronic device may request, from the origin server, an uncacheable resource that has been changed within a predetermined time such as "announcement 606" from among the resources of "A art museum."

According to another embodiment, the electronic device may directly receive the cacheable resources from among the resources included in the web page of the accessed website from the faster of the cloud server and the origin server by considering the estimated download time of the cloud server and the estimated download time of the origin server, and may directly request and receive the uncacheable resources from the origin server. Therefore, the loading speed of the website is improved.

Figure 7:
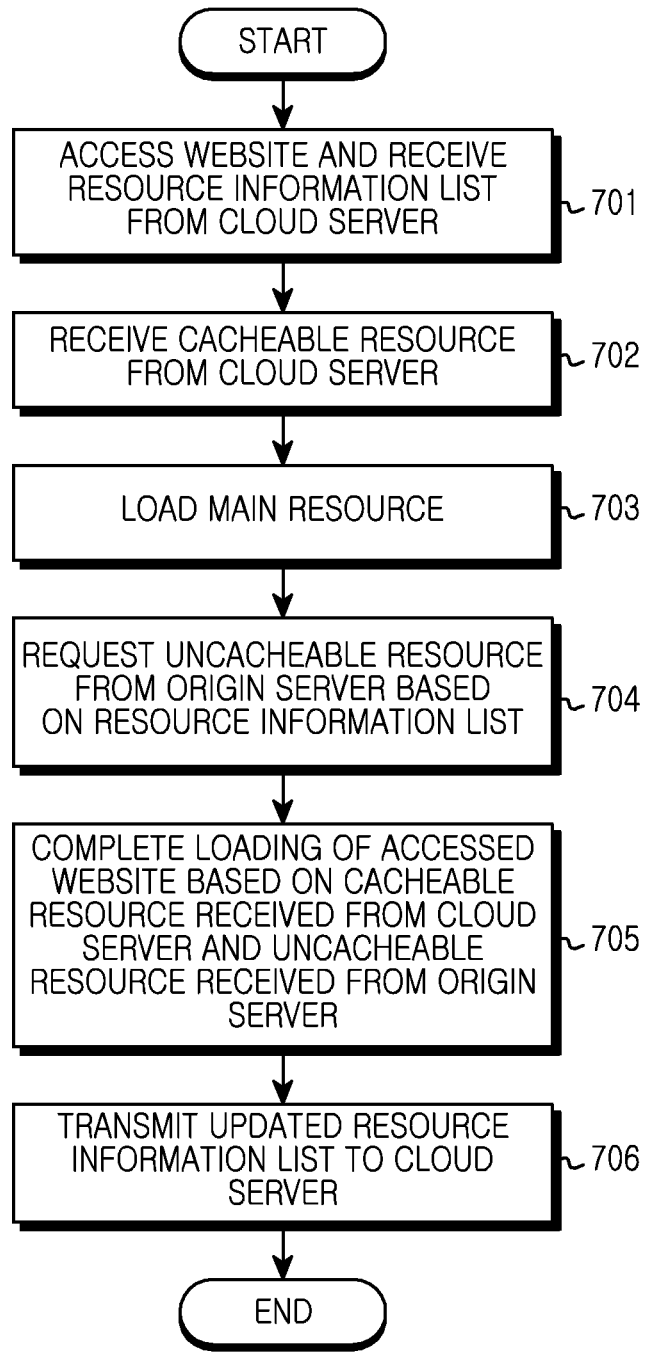
FIG. 7 illustrates a sequence diagram of an electronic device according to embodiments of the present invention.

FIG. 7 illustrates a sequence diagram of an electronic device according to embodiments of the present invention. As shown in FIG. 7, in step 701, the electronic device accesses a specific website and receives a resource information list from a cloud server. The electronic device may receive a resource information list including at least one piece of information of information on whether there is a cacheable resource from among the resources of the specific website, and information including URL, file type, file size, priority, and timing information.

In step 702, the electronic device may receive a cacheable resource from the cloud server. According The electronic device may receive only the cacheable resources from among the resources included in the accessed website from the cloud server simultaneously or serially.

In step 703, the electronic device may load a main resource. When the main resource is a cacheable resource, the electronic device may receive the main resource along with the cacheable resource from the cloud server. When the main resource is an uncacheable resource, the electronic device may receive the main resource that the cloud server receives from an origin server.

In step 704, the electronic device may request an uncacheable resource from the origin server based on the resource information list. The electronic device may analyze the resource information list received from the cloud server and request only the uncacheable resource from among the resources included in the website from the origin server.

In step 705, the electronic device may complete loading of the accessed website based on the cacheable resource received from the cloud server and the uncacheable resource received from the origin server. The electronic device may directly receive the cacheable resource from among the resources included in the webpage of the accessed website from the faster of the cloud server and the origin server by considering an estimated download time of the cloud server and an estimated download time of the origin server, and may directly request and receive the uncacheable resource from the origin server. Therefore, the loading speed of the website is improved.

In step 706, the electronic device may transmit an updated resource information list to the cloud server. The electronic device may update the resource information list based on updated information and transmit the updated resource information list to the cloud server.

Figure 8:
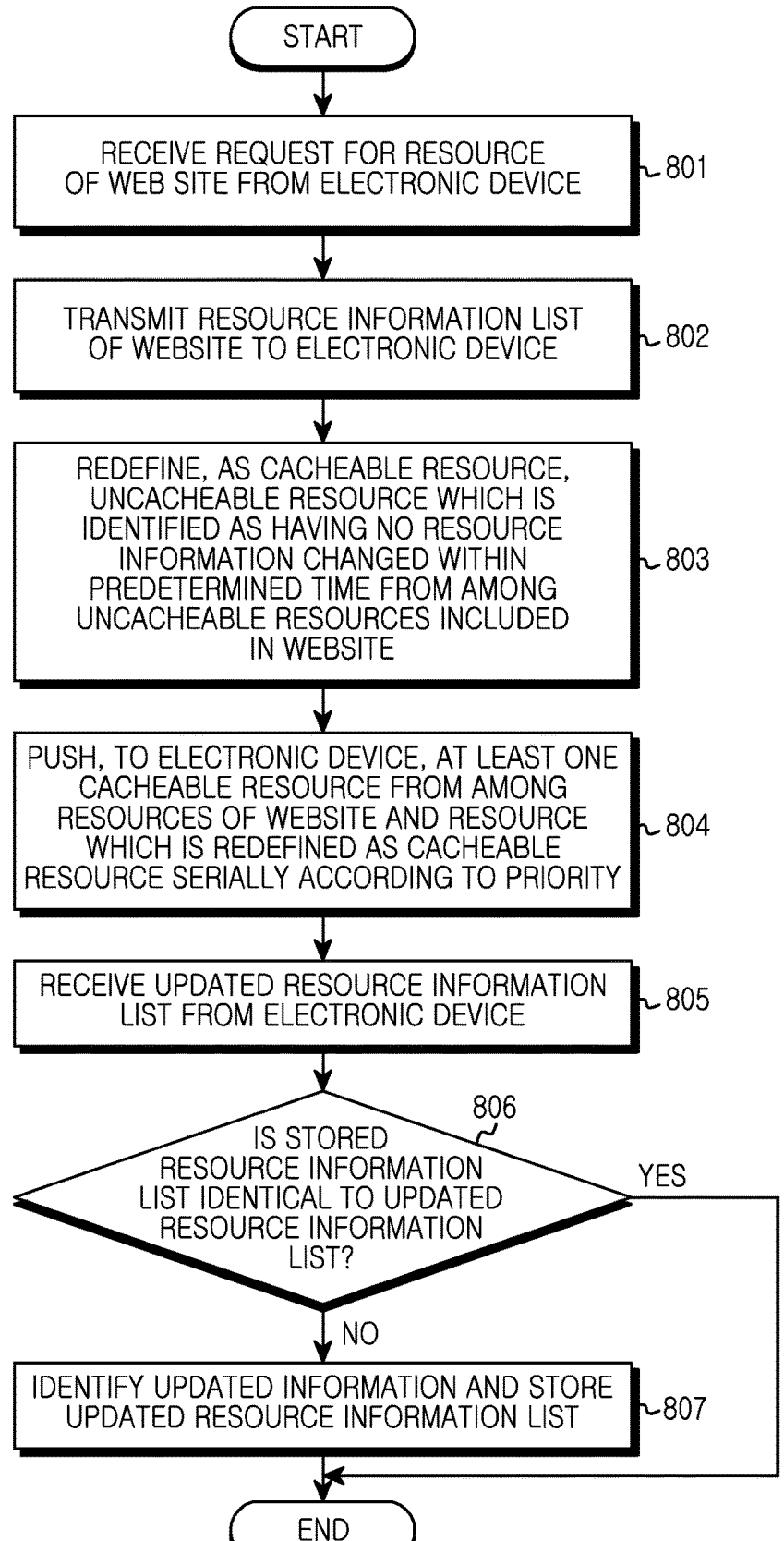
FIG. 8 illustrates a sequence diagram of a cloud server according to embodiments of the present invention.

FIG. 8 illustrates a sequence diagram of a cloud server according to embodiments of the present invention. As shown in FIG. 8, in step 801, the cloud server may receive a request for a resource of a specific web site from an electronic device. When it is determined that a main resource of the website requested by the electronic device is an uncacheable resource, the cloud server may request the main resource from an origin server.

In step 802, the cloud server may transmit a resource information list of the website to the electronic device. The cloud server may transmit a resource information list including at least one piece of information of information on whether there is a cacheable resource from among the resources of the website requested by the electronic device, and information including URL, file type, fie size, priority, and timing information.

In step 803, the cloud server may redefine, as a cacheable resource, an uncacheable resource that is identified as having no resource information changed within a predetermined time from among the uncacheable resources included in the website. The cloud server may redefine a resource which was initially set as an uncacheable resource according to the HTTP standard but is determined as being unchanged. The cloud server may compare a resource and past information in a specific period. When the resource is identical to the past information, may the cloud server redefine the resource as a temporary cacheable resource.

In step 804, the cloud server may push at least one cacheable resource from among the resources of the website and the resource redefined as a cacheable resource serially according to priority which is determined by considering the information such as timing information. The cloud server may transmit only the cacheable resource including the temporary cacheable resource from among the resources included in the website to the electronic device.

In step 805, the cloud server may receive an updated resource information list from the electronic device, which list may be updated in the electronic device.

In step 806, the cloud server may determine whether the stored resource information list is identical to the updated resource information list, such as the list received from the electronic device.

In step 807, when the cloud server determines that the stored resource information list is not identical to the updated resource information list, the cloud server may identify the updated information and store the updated resource information list. According to an embodiment, the cloud server may store the updated resource information list and then may utilize the updated resource information list when receiving a request for resource information of the same website from the electronic device later.

Figure 9:
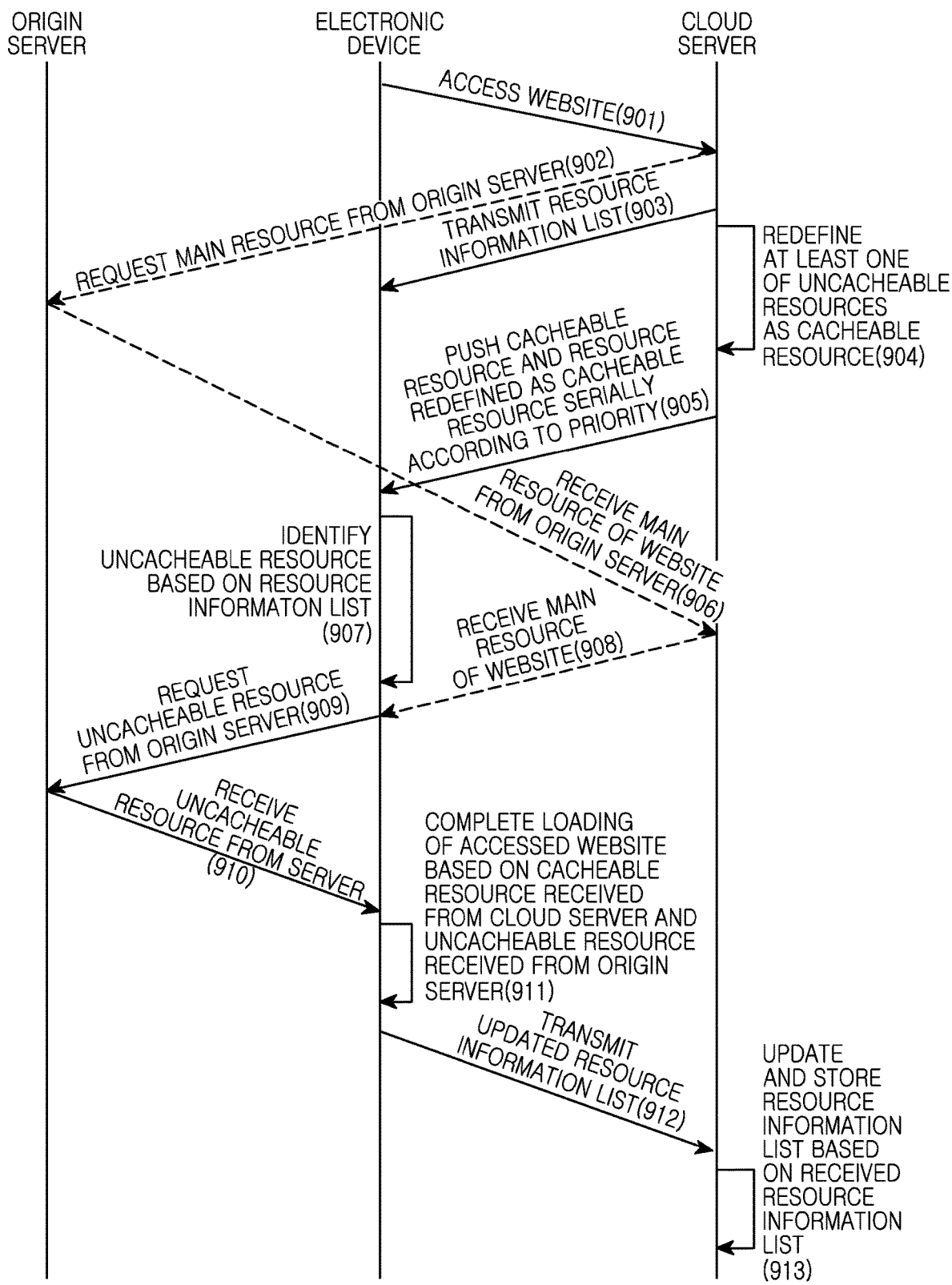
FIG. 9 illustrates a flowchart of an origin server, an electronic device, and a cloud server according to embodiments of the present invention.

FIG. 9 illustrates a flowchart of an origin server, an electronic device, and a cloud server according to embodiments of the present invention. As shown in FIG. 9, in step 901, the electronic device may access a specific website. According to an embodiment, the electronic device may receive an input of a URL of the specific website, access the cloud server, and request a resource of the specific website.

In step 902, the cloud server may request a main resource from the origin server. According to an embodiment, the cloud server may determine whether the main resource of the website requested by the electronic device is a cacheable resource. According to an embodiment, when it is determined that the main resource of the website requested by the electronic device is an uncacheable resource, the cloud server may request the main resource from the origin server. According to an embodiment, when it is determined that the main resource of the website requested by the electronic device is a cacheable resource, the cloud server may not request the main resource from the origin server. According to an embodiment, when it is determined that the main resource of the website requested by the electronic device is a cacheable resource, the cloud server may use the main resource stored in the cloud server.

In step 903, the cloud server may transmit a resource information list of the website stored in the cloud server to the electronic device. According to an embodiment, when the cloud server receives a request for resource information of "A website" from the electronic device, the cloud server may transmit a resource information list of "A website" stored in the cloud server to the electronic device. According to an embodiment, the resource information list may include at least one piece of information of information on whether there is a cacheable resource from among the resources of a specific website, and information including URL, file type, file size, priority, and timing information.

In step 904, the cloud server may redefine at least one of the uncacheable resources as a cacheable resource. According to an embodiment, the cloud server may redefine an uncacheable resource that is identified as having no resource information changed within a predetermined time from among the uncacheable resources included in the website as a cacheable resource.

In step 905, the cloud server pushes the cacheable resource and the resource redefined as the cacheable resource serially according to priority which is determined by considering timing information and the like. According to an embodiment, the cloud server pushes the cacheable resources until all of the cacheable resources are transmitted to the electronic device.

In step 906, when the cloud server requests the main resource from the origin server, the cloud server may receive the main resource from the origin server. According to an embodiment, when the main resource is a cacheable resource, the operation of receiving the main resource from the origin server by the cloud server may be omitted.

In step 907, the electronic device may identify an uncacheable resource based on the resource information list. The electronic device may analyze the resource information list received from the cloud server and identify the uncacheable resource from among the resources of the accessed website.

In step 908, the electronic device receives the main resource of the website from the cloud server.

In step 909, the electronic device may request the uncacheable resource from the origin server. The electronic device may analyze the resource information list received from the cloud server and request only the uncacheable resource from among the resources of the website from the origin server.

In step 910, the electronic device may receive the requested uncacheable resource from the origin server. Specifically, the electronic device may receive the cacheable resource from among the resources of the accessed website from the cloud server and receive the uncacheable resource from the origin server.

In step 911, the electronic device may complete loading of the accessed website based on the cacheable resource received from the cloud server and the uncacheable resource received from the origin server. When the electronic device accesses "A website", the electronic device may complete loading of "A website" by receiving a cacheable resource from among the resources of "A website" from the cloud server and receiving an uncacheable resource from the origin server.

In step 912, the electronic device may transmit an updated resource information list to the cloud server. The electronic device may update at least one piece of information until the loading of the accessed website is completed, update the resource information list based on the updated information, and transmit the updated resource information list to the cloud server.

In step 913, the cloud server may update the resource information list based on the resource list received from the electronic device and store the updated resource information list. When the cloud server receives a request for the resource of the same website from the electronic device, the cloud server may transmit the resource information list which has been updated and stored to the electronic device.

Figure 10:
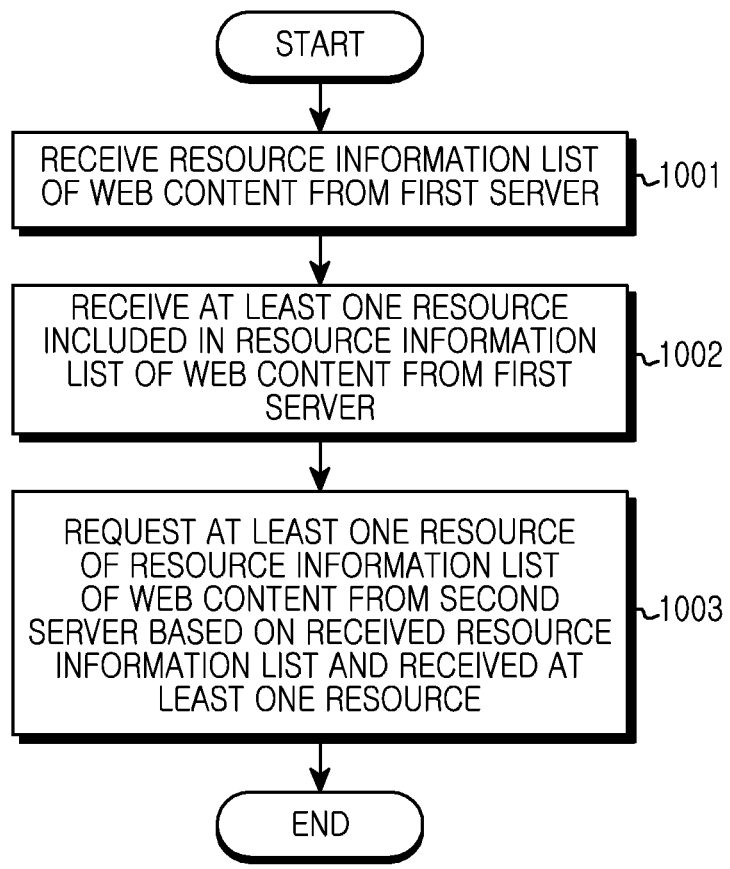
FIG. 10 illustrates a flowchart of a method of an electronic device according to embodiments of the present invention.

FIG. 10 illustrates a flowchart of a method of an electronic device according to embodiments of the present invention. As shown in FIG. 10, in step 1001, the electronic device may receive a resource information list of a website accessed by the electronic device from a cloud server. The resource information list may include at least one piece of information on whether there is a cacheable resource from among the resources of a specific website, and information including URL, file type, file size, priority, and timing information.

In operation 1002, the electronic device may receive at least one cacheable resource from among the resources of the website from the cloud server. According to an embodiment, the electronic device may receive the cacheable resource from among the resources of the website and a resource which is redefined as a cacheable resource from among the uncacheable resources from the cloud server.

In operation 1003, the electronic device may request at least one uncacheable resource from among the resources of the website from the origin server based on the received resource information list. The electronic device may analyze the resource information list received from the cloud server and request only the uncacheable resource from among the resources of the accessed website from the origin server. Specifically, the electronic device may receive the cacheable resource from among the resources of the accessed website from the cloud server, and receive the uncacheable resource from the origin server.

Figure 11:
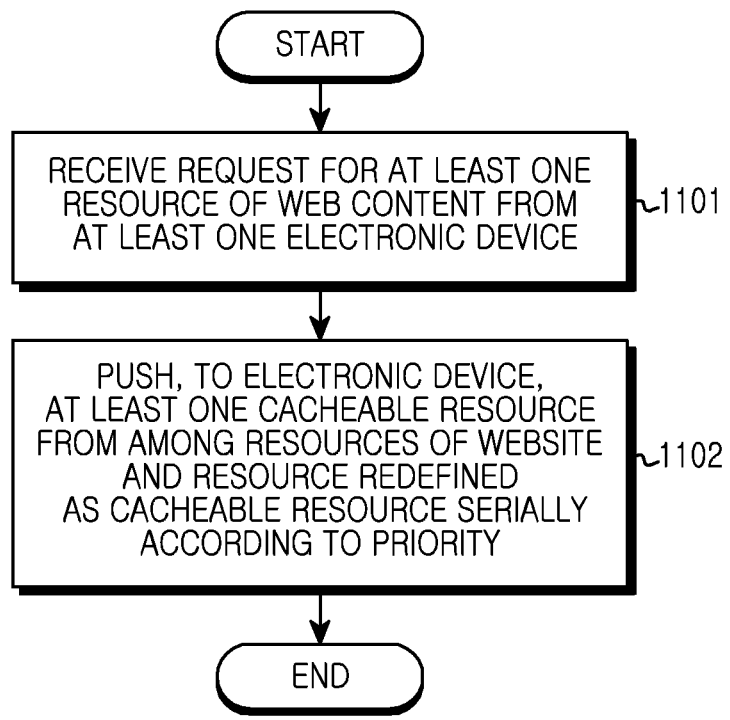
FIG. 11 illustrates a flowchart of a method of a cloud server according to embodiments of the present invention.

FIG. 11 illustrates a flowchart of a method of a cloud server according to embodiments of the present invention. As shown in FIG. 11, in step 1101, the cloud server may receive a request for at least one resource of a specific website from at least one electronic device. The cloud server may determine whether a main resource of the website requested by the electronic device is a cacheable resource. When it is determined that the main resource of the website requested by the electronic device is an uncacheable resource, the cloud server may request and use the main resource from an origin server. When it is determined that the main resource of the website requested by the electronic device is a cacheable resource, the cloud server may do not request the main resource from the origin server.

In step 1102, the cloud server may push at least one cacheable resource from among the resources of the website and a resource which is redefined as a cacheable resource to the electronic device serially according to set priority. The cloud server may redefine an uncacheable resource that is identified as having no resource information changed within a predetermined time from among the uncacheable resources included in the website as a cacheable resource.

While the present invention has been shown and described with reference to certain embodiments thereof, it will be understood by those skilled in the art that changes in form and details may be made therein without departing from the spirit and scope of the present invention as defined by the appended claims.

What is claimed is:

1. A method of an electronic device, the method comprising:
in response to accessing a web page, receiving an information list regarding resources required for loading the web page from a first server, wherein the information list includes data indicating which resource among the resources corresponds to the at least one cacheable resource;
identifying, by using a processor of the electronic device, at least one resource among the resource indicated by the data as the at least one cacheable resource, and identifying, by using the processor, remaining resources, among the resources, as at least one uncacheable resource;
calculating a first estimated download time for downloading the at least one cacheable resource through the first server and a second estimated download time for downloading the at least one cacheable resource through a second server;
determining, among the first server and the second server, a server that has a shorter estimated download time for the at least one cacheable resource by comparing the first estimated download time and the second estimated download time;
transmitting, to the server that has the shorter estimated download time, a first request for receiving the at least one cacheable resource from the server;
receiving, from the server, the at least one cacheable resource, in response to the first request;
transmitting, to the second server, a second request for receiving the at least one uncacheable resource from the second server, without using the first server;
receiving, from the second server, without using the first server, the at least one uncacheable resource, in response to the second request; and
in response to receiving the at least one cacheable resource and the at least one uncacheable resource, loading the web page by using the received at least one cacheable resource and the received at least one uncacheable resource.

2. The method of claim 1, wherein the received information list further includes a priority of requesting the at least one cacheable resource or the at least one uncacheable resource, and
wherein the at least one uncacheable resource received from the second server is received according to the priority.

3. The method of claim 1, further comprising:
identifying the at least one cacheable resource from among the resources included in the web page as being downloadable from the first server and the second server, based on the received information list.

4. The method of claim 1, wherein the first server is a cloud server and the second server is a web server which stores data associated with the web page.

5. The method of claim 1, wherein the information list further includes Uniform Resource Locator information, file type information, file size information, priority information, and timing information,
wherein the timing information is associated with requesting at least one resource from the first server or the second server and receiving, in response, the at least one resource from the first server or the second server, and
wherein the at least one resource is the at least one cacheable resource or the at least one uncacheable resource.

6. The method of claim 5, wherein transmitting the first request for receiving the at least one cacheable resource from the server is based at least in part on the timing information.

7. The method of claim 1, further comprising:
updating at least one data while loading the web page;
updating the received information list based on the updated at least one data; and
transmitting the updated information list to the first server.

8. An electronic device, comprising:
a memory storing instructions;
a communication module; and
a processor, coupled with the communication module and memory, configured to execute the stored instructions to:
receive, in response to accessing a web page, an information list regarding resources required for loading the web page, from a first server, wherein the information list includes data indicating which resource among the resources corresponds to the at least one cacheable resource,
identify, by using the processor, at least one resource among the resource indicated by the data as the at least one cacheable resource, and identifying, by using the processor, remaining resources, among the resources, as at least one uncacheable resource,
calculate a first estimated download time for downloading the at least one cacheable resource through the first server and a second estimated download time for downloading the at least one cacheable resource through a second server, determine, among the first server and the second server, a server that has a shorter estimated download time for the at least one cacheable resource by comparing the first estimated download time and the second estimated download time, transmit, to the server that has the shorter estimated download time, a first request for receiving the at least one cacheable resource from the server, receive, from the server, the at least one cacheable resource, in response to the first request, transmit, to the second server, a second request for receiving the at least one uncacheable resource from the second server, without using the first server, receive, from the second server, without using the first server, the at least one uncacheable resource, in response to the second request, and in response to receiving the at least one cacheable resource and receiving the at least one uncacheable resource, load the web page by using the received at least one cacheable resource and the received at least one uncacheable resource.

9. The electronic device of claim 8, wherein the received information list further includes a priority of requesting the at least one cacheable resource or the at least one uncacheable resource, and wherein the at least one uncacheable resource received from the second server is received according to the priority.

10. The electronic device of claim 8, wherein the processor is further configured to execute the stored instructions to:
identify the at least one cacheable resource from among the resources included in the web page as being downloadable from the first server and the second server, based on the received information list.

11. The electronic device of claim 8, wherein the first server is a cloud server and the second server is a web server which stores data associated with the web page.

12. The electronic device of claim 8, wherein the information list further includes Uniform Resource Locator information, file type information, file size information, priority information, and timing information, wherein the timing information is associated with requesting at least one resource from the first server or the second server and receiving, in response, the at least one resource from the first server or the second server, and wherein the at least one resource is the at least one cacheable resource or the at least one uncacheable resource.

13. The electronic device of claim 12, wherein the processor is further configured to transmit the first request for receiving the at least one cacheable resource from the server based at least on the timing information.

14. The electronic device of claim 8, wherein the processor is further configured to execute the stored instructions to:
update at least one data while loading the web page,
update the received information list based on the updated at least one data, and
transmit the updated information list to the first server.

* * * * *